United States Patent
Han et al.

(10) Patent No.: US 12,523,257 B2
(45) Date of Patent: Jan. 13, 2026

(54) BEARING SEAT ASSEMBLY AND CONVERTER DEVICE

(71) Applicant: Schaeffler Technologies AG & Co. KG, Herzogenaurach (DE)

(72) Inventors: Huimin Han, Jiangsu (CN); Klaus Zimmermann, Oberthulba (DE); Philipp Weippert, Dettelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 16 days.

(21) Appl. No.: 18/695,472

(22) PCT Filed: Oct. 15, 2021

(86) PCT No.: PCT/CN2021/124205
§ 371 (c)(1),
(2) Date: Mar. 26, 2024

(87) PCT Pub. No.: WO2023/060591
PCT Pub. Date: Apr. 20, 2023

(65) Prior Publication Data
US 2024/0392838 A1 Nov. 28, 2024

(51) Int. Cl.
*F16C 35/077* (2006.01)
*F16C 23/08* (2006.01)
(Continued)

(52) U.S. Cl.
CPC ............ *F16C 35/077* (2013.01); *F16C 23/08* (2013.01); *F16C 29/04* (2013.01); *F16C 31/04* (2013.01)

(58) Field of Classification Search
CPC .......... F16C 23/08; F16C 29/04; F16C 31/04; F16C 35/077; C21C 5/464
See application file for complete search history.

(56) References Cited

U.S. PATENT DOCUMENTS 2,976,090 A * 3/1961 Mcfeaters ............... C21C 5/464
384/559
3,170,737 A    2/1965 Denne, Jr.
(Continued)

FOREIGN PATENT DOCUMENTS

CA         728039 A       2/1966
CN      201801542 U       4/2011
(Continued)

OTHER PUBLICATIONS

Machine Translation of SU-393498-A (Year: 1973).*

*Primary Examiner* — Alan B Waits
(74) *Attorney, Agent, or Firm* — Volpe Koenig (57) ABSTRACT

A bearing seat assembly comprising first and second bearing seats, and linear bearings located there between. A convex portion protruding toward a first bottom portion of the first bearing seat is formed in the central portion of a second bottom portion of the second bearing seat, and a recessed shape recessed toward a direction away from the first bottom portion is formed in a part of the second bottom portion between the convex portion and both end portions of the second bottom portion. A concave portion opposite to the convex portion is formed in the first bottom portion, the concave portion has an opening that is open toward the convex portion, and the convex portion is inserted into the concave portion by passing through the opening, so that the stress distribution and magnitude of the second bearing seat are optimized, and the risk of failure of the linear bearings is reduced.

18 Claims, 3 Drawing Sheets

(51) Int. Cl.
*F16C 29/04* (2006.01)
*F16C 31/04* (2006.01)

(56) References Cited

U.S. PATENT DOCUMENTS

| | | | | |
|---|---|---|---|---|
| 3,291,541 A | * | 12/1966 | Dellinger | ................ F16C 23/08 |
| | | | | 432/104 |
| 3,291,542 A | * | 12/1966 | North | .................... F16C 35/042 |
| | | | | 384/418 |
| 3,311,427 A | * | 3/1967 | Toth | ........................ F16C 31/04 |
| | | | | 384/54 |
| 3,350,144 A | * | 10/1967 | Beckman | .............. C21C 5/4633 |
| | | | | 384/13 |
| 3,523,714 A | | 8/1970 | Puhringer | |
| 3,887,248 A | | 6/1975 | Riegler | |
| 3,901,566 A | | 8/1975 | Riegler et al. | |
| 4,080,014 A | | 3/1978 | Riegler et al. | |

FOREIGN PATENT DOCUMENTS

| | | | |
|---|---|---|---|
| DE | 102012222595 A1 | | 6/2014 |
| SU | 393498 A | * | 12/1973 |

* cited by examiner

BEARING SEAT ASSEMBLY AND CONVERTER DEVICE

CROSS REFERENCE TO RELATED APPLICATIONS

This application claims the benefit of PCT Application No. PCT/CN2021/124205 filed on Oct. 15, 2021, which is incorporated by reference as if fully set forth.

TECHNICAL FIELD

The present application relates to the field of bearing seats, and in particular, to a bearing seat assembly for a converter device in a steel plant and the converter device comprising the bearing seat assembly.

BACKGROUND

Figure 1:
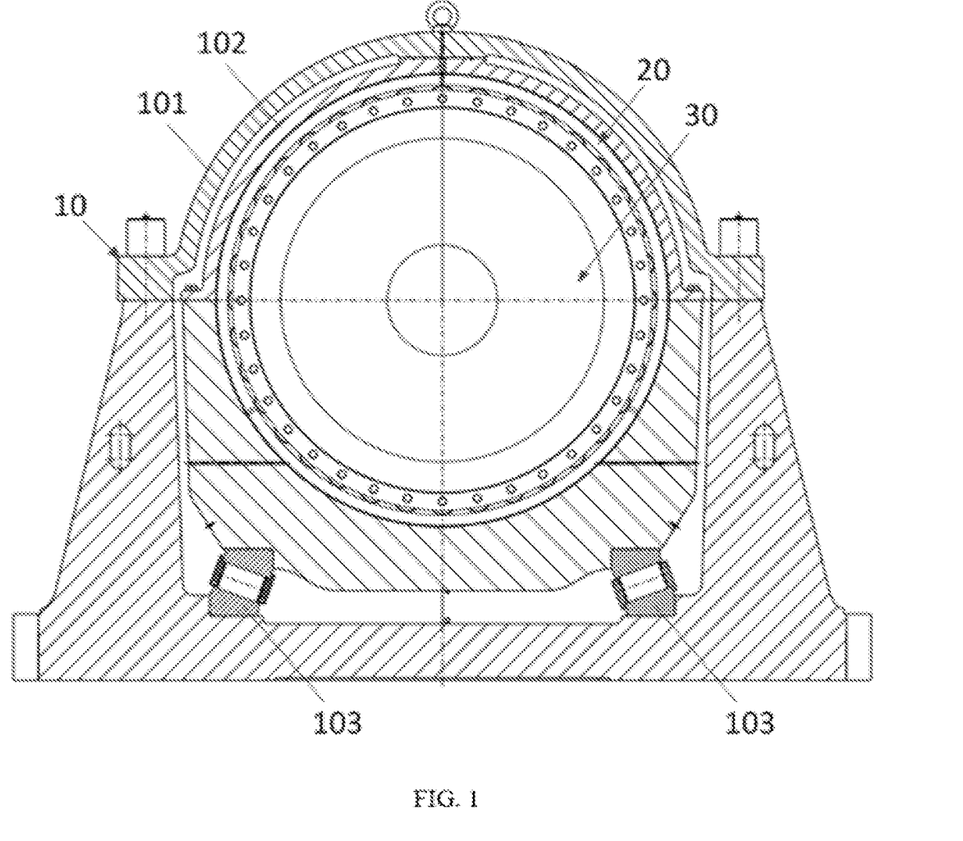
FIG. 1 is a schematic cross-sectional view illustrating a partial structure of a converter device.

In a partial structure of a converter device shown in FIG. 1, to support a radial bearing 20 in a so-called floating manner, a bearing seat assembly 10 comprises a first bearing seat 101, a second bearing seat 102, and linear bearings 103. The first bearing seat 101 is used as an outer bearing seat for supporting the second bearing seat 102 and the linear bearings 103, the second bearing seat 102 is used as an inner bearing seat for mounting the radial bearing 20, and the linear bearings 103 are located between the first bearing seat 101 and the second bearing seat 102, such that the second bearing seat 102 is enabled to perform linear motion relative to the first bearing seat 101. In addition, because the linear bearings 103 are mounted between the bottom portion of the first bearing seat 101 and the bottom portion of the second bearing seat 102, there is a large gap between the bottom portion of the first bearing seat 101 and the bottom portion of the second bearing seat 102, such that the bottom portion of the second bearing seat 102 floats relative to the bottom portion of the first bearing seat 101. In this way, the radial bearing 20 mounted in the second bearing seat 102 realizes the so-called floating function. In addition, to ensure that the two bearing seats 101 and 102 do not interfere with each other during the mounting and use of the bearing seat assembly 10, there is a large gap between all but the top parts of the two bearing seats 101 and 102. Further, a shaft 30 is mounted in a bearing hole of the bearing 20, and the bearing 20 is mounted in a bearing seat hole of the second bearing seat 102.

However, in the case that the bottom portion of the first bearing seat 101 is mounted in the horizontal plane, when the converter device is operating, the radial bearing 20 sometimes bears a large radial load in the vertical direction and horizontal direction, which is further transferred to the bearing seat assembly 10, causing the following problems.

On the one hand, when there is a large radial load in the vertical direction, the bearing seat assembly 10 may produce severe vibrations, and, as a result, the stress distribution in the bearing seat assembly 10 has an adverse effect on the structure of the second bearing seat 102 (inner bearing seat). In particular, the stress distribution at the substantially central position of the bottom portion of the second bearing seat 102 is concentrated and the stress is large, which has a significantly adverse effect on the structure of the second bearing seat 102 and may thus cause the second bearing seat 102 to break.

On the other hand, when there is a large radial load in the horizontal direction, the second bearing seat 102 is prone to a tilt, resulting in a high risk of failure in two left and right linear bearings 103 mounted between the two bearing seats. Due to the tilt of the second bearing seat 102, the loads borne by the two linear bearings 103 are unequal, causing one of the linear bearings 103 to be overloaded, and rollers of the linear bearings 103 may further produce an edge stress in this case. In short, it is likely to cause an early failure of the linear bearings 103.

SUMMARY

The present application has been made in view of the defects of the prior art as described above. An objective of the present application is to provide a novel bearing seat assembly that can optimize the stress distribution and stress magnitude of an inner bearing seat under loads in the vertical direction, such that the adverse effect that stress may have on the inner bearing seat is reduced, and the possibility of early failure of linear bearings under loads in the horizontal direction may be reduced. Another objective of the present application is to provide a converter device comprising the foregoing bearing seat assembly.

To achieve the above disclosed objective, the present application adopts the following technical solutions.

The present application provides a bearing seat assembly comprising:

a first bearing seat, wherein the first bearing seat has a mounting space formed therein, and the first bearing seat has a first bottom portion;

a second bearing seat, wherein the second bearing seat is mounted in the mounting space and has a second bottom portion; and linear bearings, wherein the linear bearings are mounted in the mounting space and are located between the first bottom portion and the second bottom portion, and the second bearing seat is supported by the linear bearings, such that the second bottom portion and the first bottom portion are spaced in the height direction of the bearing seat assembly, and that the second bearing seat is enabled to perform linear relative motion relative to the first bearing seat, wherein the second bottom portion is formed to have the following shape: a convex portion protruding toward the first bottom portion is formed in the central portion of the second bottom portion in the width direction of the bearing seat assembly, and a recessed shape recessed toward a direction away from the first bottom portion is formed in a part of the second bottom portion between the convex portion and both end portions of the second bottom portion in the width direction; and a concave portion opposite to the convex portion is formed in the first bottom portion, the concave portion has an opening that is open toward the convex portion, and the convex portion is inserted into the concave portion by passing through the opening.

In an optional solution, in the cross-section of the second bearing seat, the outline of the recessed shape comprises a curve.

In another optional solution, two shoulder portions protruding toward the second bottom portion are formed in the first bottom portion, and the concave portion is formed between the two shoulder portions.

In another optional solution, two linear bearings are located on both sides of the convex portion in the width direction, to support both end portions of the second bottom portion in the width direction.

In another optional solution, the first bearing seat comprises a first side wall portion and a second side wall portion, the first side wall portion and the second side wall portion are fixed to the first bottom portion and are spaced in the width direction, and the second bearing seat is located between the first side wall portion and the second side wall portion; and the bearing seat assembly further comprises a first stopper and a second stopper, the first stopper is clamped between the second bearing seat and the first side wall portion, and the second stopper is clamped between the second bearing seat and the second side wall portion.

In another optional solution, the first stopper is detachably fixed to the first side wall portion, and the second stopper is detachably fixed to the second side wall portion.

In another optional solution, a first mounting concave portion is formed in the first side wall portion, the first stopper is at least partially located in the first mounting concave portion, and a second mounting concave portion is formed in the second side wall portion, the second stopper is at least partially located in the second mounting concave portion.

In another optional solution, the first bearing seat further comprises a first cover portion, the first cover portion is detachably fixed to the first side wall portion and the second side wall portion, and the first cover portion, the first bottom portion, the first side wall portion, and the second side wall portion form the mounting space in an enclosed manner.

In another optional solution, the second bearing seat further comprises a second cover portion, the second cover portion is fixed to the second bottom portion, and the second cover portion and the second bottom portion form, in an enclosed manner therebetween, a bearing seat hole for mounting a radial bearing.

The present application also provides a converter device comprising a radial bearing, a shaft, and the bearing seat assembly as described in any of the foregoing technical solutions, wherein the radial bearing is mounted in the second bearing seat, the outer ring of the radial bearing is fixed to the second bearing seat, and the shaft is inserted into a bearing hole of the radial bearing and is fixed to the inner ring of the radial bearing.

By adopting the foregoing technical solutions, the present application provides a bearing seat assembly and a converter device comprising the bearing seat assembly. The bearing seat assembly comprises a first bearing seat, a second bearing seat, and linear bearings. The first bearing seat has a mounting space formed therein and has a first bottom portion. The second bearing seat is mounted in the mounting space and has a second bottom portion. The linear bearings are mounted in the mounting space, and the linear bearings are located between the first bottom portion and the second bottom portion. The second bearing seat is supported by the linear bearings in a manner that the second bottom portion and the first bottom portion are spaced in the height direction, such that the second bearing seat is enabled to perform linear relative motion relative to the first bearing seat. Because the second bearing seat floats relative to the first bearing seat in the height direction and is enabled to perform linear relative motion, a radial bearing mounted in the second bearing seat realize the so-called floating function.

Further, the second bottom portion is formed to have the following shape: a convex portion protruding toward the first bottom portion is formed in the central portion of the second bottom portion in the width direction, and a recessed shape recessed toward a direction away from the first bottom portion is formed in a part of the second bottom portion between the convex portion and both end portions in the width direction. In addition, a concave portion opposite to the convex portion is formed in the first bottom portion, the concave portion has an opening that is open toward the convex portion, and the convex portion is inserted into the concave portion by passing through the opening.

In this way, the central portion of the bottom portion of the second bearing seat is formed into a shape that is convex in the middle and concave on both sides; and this structure is proved through stress analysis tests that it is capable of optimizing the stress distribution of the second bearing seat for supporting the radial bearing under a large load in the vertical direction, alleviating the stress concentration at the bottom portion of the second bearing seat, and greatly reducing the stress at the bottom portion of the second bearing seat, thereby reducing the adverse effect of the stress on the structure of the second bearing seat. In addition, a concave portion corresponding to the convex portion of the second bearing seat is further formed in the bottom portion of the first bearing seat, which can prevent the second bearing seat from tilting when the second bearing seat bears a large load in the horizontal direction, thereby ensuring uniform forces applied to the linear bearings and effectively reducing the risk of early failure of the linear bearings.

DETAILED DESCRIPTION

Exemplary embodiments of the present application are described below with reference to the accompanying drawings. It should be understood that these specific descriptions are only used to teach those skilled in the art how to implement the present application, and are neither intended to be exhaustive of all possible ways of the present application nor to limit the scope of the present application.

In the present application, unless otherwise specified, "axial direction" refers to the axial direction of a bearing seat hole of a second bearing seat, as well as the axial direction of a radial bearing and a shaft; "height direction" refers to the height direction of a bearing seat assembly, that is, the up-and-down direction in FIG. 2 (the vertical direction in a case that a first bearing seat is fixed in the horizontal plane), and the height direction is perpendicular to the axial direction; and "width direction" refers to the width direction of the bearing seat assembly, that is, the left-and-right direction in FIG. 2 (the horizontal direction in the case that the first bearing seat is fixed in the horizontal plane), and the width direction is perpendicular to the axial direction and the height direction.

A structure of a bearing seat assembly according to an embodiment of the present application will be described with reference to the accompanying drawings of the specification.

Figure 2:
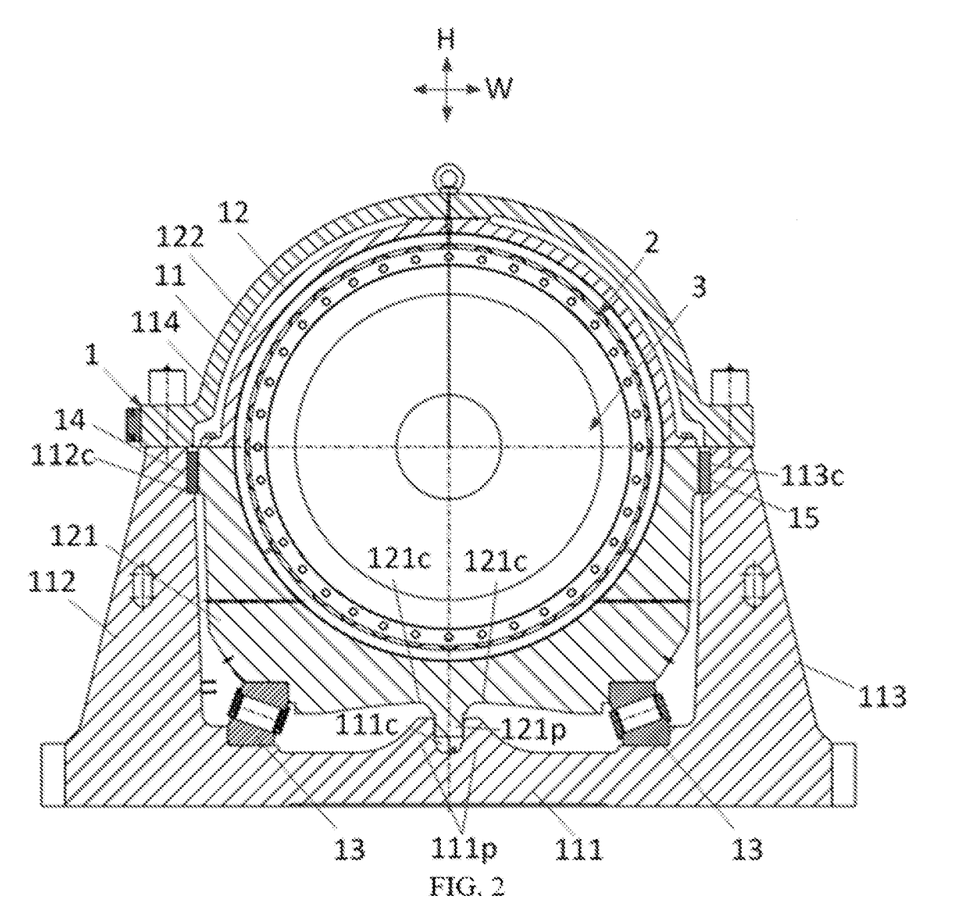
FIG. 2 is a schematic cross-sectional view illustrating a partial structure of a converter device according to the present application, wherein the converter device comprises a bearing seat assembly according to an embodiment of the present application.
Figure 3:
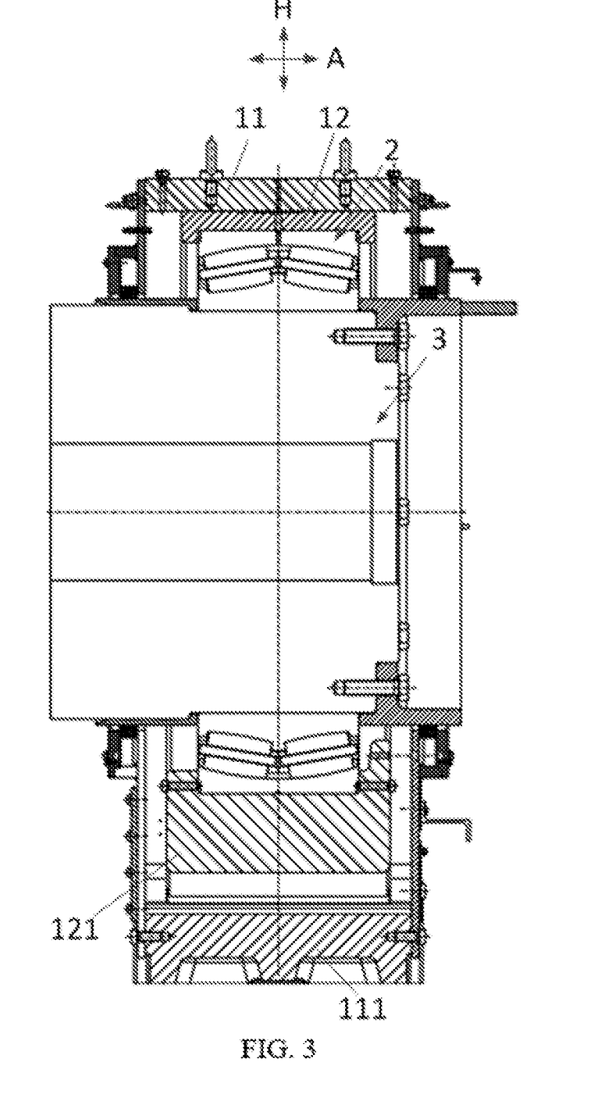
FIG. 3 is another schematic cross-sectional view illustrating the structure in FIG. 2.

As shown in FIGS. 2 and 3, a converter device according to the present application comprises a bearing seat assembly 1, a radial bearing 2, and a shaft 3 according to an embodiment of the present application. The radial bearing 2 is mounted in a bearing seat hole of a second bearing seat 12, the outer ring of the radial bearing 2 is fixed to the second bearing seat 12, and the shaft 3 is inserted into a bearing hole of the radial bearing 2 and fixed to the inner ring of the bearing. In this way, the shaft 3 supported by the radial bearing 2 can freely rotate relative to the bearing seat assembly 1.

As shown in FIGS. 2 and 3, the bearing seat assembly 1 according to an embodiment of the present application comprises a first bearing seat 11, the second bearing seat 12, two linear bearings 13, a first stopper 14, and a second stopper 15 that are assembled together.

In this embodiment, the first bearing seat 11 is used for supporting the second bearing seat 12, the two linear bearings 13, the first stopper 14, and the second stopper 15. Specifically, the first bearing seat 11 comprises a first bottom portion 111, a first side wall portion 112, a second side wall portion 113, and a first cover portion 114.

In the width direction of the bearing seat assembly 1, the first bottom portion 111 has a sufficient width. The first side wall portion 112 and the second side wall portion 113 are spaced at a certain distance in the width direction W for placing the second bearing seat 12. The first side wall portion 112 and the second side wall portion 113 are fixed to both end portions of the first bottom portion 111 in the width direction (in this embodiment, the first side wall portion 112 and the second side portion are integrally formed with the first bottom portion 111). The width of the first side wall portion 112 gradually increases from the top end portion toward the bottom end portion, and the width of the second side wall portion 113 gradually increases from the top end portion toward the bottom end portion. A main portion of the first cover portion 114 has an arc-shaped cross section. The first cover portion 114 is detachably fixed to the first side wall portion 112 and the second side wall portion 113 by means of threaded connectors. Specifically, one end portion of the first cover portion 114 is fixed to the top end portion of the first side wall portion 112, the other end portion of the first cover portion 114 is fixed to the top end portion of the second side wall portion 113, and the first cover portion 114 bulges toward a direction away from the first bottom portion 111. In this way, the first bottom portion 111, the first side wall portion 112, the second side wall portion 113, and the first cover portion 114 form, in an enclosed manner, a mounting space for mounting the second bearing seat 12 and the linear bearings 13.

In this embodiment, the second bearing seat 12 is located between the first side wall portion 112 and the second side wall portion 113 and is mounted in the mounting space. Specifically, the second bearing seat 12 comprises a second bottom portion 121 and a second cover portion 122.

The second bottom portion 121 and the first bottom portion 111 are opposite to and spaced apart from each other in the height direction H. A main portion of the second cover portion 122 has an arc-shaped cross section, and the top portion of the second cover portion 122 is in contact with the top portion of the first cover portion 114. By using threaded connectors, both end portions of the second cover portion 122 are detachably fixed to both end portions of the second bottom portion 121 in the width direction. In this way, the second cover portion 122 and the second bottom portion 121 form, in an enclosed manner therebetween, a bearing seat hole for mounting the radial bearing 2.

In this embodiment, the two linear bearings 13 are mounted in the mounting space and are located between the first bottom portion 111 and the second bottom portion 121, such that the second bearing seat 12 is supported by the linear bearings 13 in a manner that the second bottom portion 121 floats relative to the first bottom portion 111, and that the second bearing seat 12 is enabled to perform linear relative motion relative to the first bearing seat 11. In this way, the radial bearing 2 supported by the second bearing seat 12 has a floating function. The two linear bearings 13 support both end portions of the second bottom portion 121 in the width direction, respectively, and the type of the linear bearings 13 may be selected as required. In addition, the direction of the foregoing linear relative motion is perpendicular to the width direction W and is consistent with the axial direction A.

To reduce the adverse effects of the bearing seat assembly 1 under large loads in the vertical direction and horizontal direction, the bearing seat assembly 1 of the present application has the following structure.

On the one hand, the second bottom portion 121 of the second bearing seat 12 is formed to have the following shape: a convex portion 121$p$ protruding toward the first bottom portion 111 is formed in the central portion of the second bottom portion 121 in the width direction W, and a recessed shape 121$c$ recessed toward a direction away from the first bottom portion 111 is formed in a part of the second bottom portion 121 between the convex portion 121$p$ and both end portions in the width direction. The outline of the recessed shape 121$c$ in the cross section may comprise a curve. It has been proved through tests that, compared with the second bearing seat 102 with a flat bottom surface on the bottom portion shown in FIG. 1, the second bearing seat 12 with this special configuration can significantly reduce the stress borne by the second bottom portion 121 (especially the central portion of the second bottom portion 121 in the width direction W) of the second bearing seat 12 under loads in the vertical direction, thereby reducing the adverse effects caused by the stress.

On the other hand, two shoulder portions 111$p$ protruding toward the second bottom portion 121 are formed in the first bottom portion 111, and a concave portion 111$e$ is formed between the two shoulder portions 111$p$. The concave portion 111$c$ has an opening that is open toward the convex portion 121$p$, and the convex portion 121$p$ is inserted into the concave portion 111$c$ by passing through the opening. Because the convex portion 121$p$ is arranged at the central position of the second bottom portion 121 in the width direction W. and correspondingly, the concave portion 111$c$ is arranged at the central position of the first bottom portion 111 in the width direction W. In addition, in the width direction W, the width of the convex portion 121$p$ is approximately equal to the width of the concave portion 111$c$, such that when the second bearing seat 12 bears a load from either side in the width direction, the side wall of the convex portion 121$p$ is capable of being in contact with the side wall of the concave portion 111$c$.

Further, a recessed first mounting concave portion 112$c$ is formed in the wall surface of the first side wall portion 112 facing the second bearing seat 12, and the first stopper 14 can be at least partially located in the first mounting concave portion 112$c$, such that the first stopper 14 is clamped between the second bearing seat 12 and the first side wall portion 112. A recessed second mounting concave portion 113$c$ is formed in the wall surface of the second side wall portion 113 facing the second bearing seat 12, and the second stopper 15 can be at least partially located in the second mounting concave portion 113$c$, such that the second stopper 15 is clamped between the second bearing seat 12 and the second side wall portion 113. In this way, through the foregoing structure in which the convex portion 121$p$ and the concave portion 111$c$ fit to each other, the risk of tilting of the second bearing seat 12 under loads in the horizontal direction can be reduced. Further, by using threaded connectors or the like, the first stopper 14 is detachably fixed to the first side wall portion 112, and the second stopper 15 is detachably fixed to the second side wall portion 113. In this way, after the first stopper 14 and the second stopper 15 are worn due to the relative movement of the second bearing seat 12 relative to the first bearing seat 11, they can be replaced with a new first stopper 14 and second stopper 15. In addition, to reduce the wear of the first stopper 14 and the second stopper 15, the first stopper 14 and the second stopper 15 may be made of metal with wear-resistant properties, such as high manganese steel.

The converter device according to the present application can realize the same effect as described above because of having the foregoing bearing seat assembly. The converter device can be used for steelmaking operations in steel plants.

The present application is not limited to the foregoing embodiments, and those skilled in the art could make various modifications to the foregoing embodiments under the teaching of the present application without departing from the scope of the present application. In addition, it should also be noted that:

In the foregoing embodiments, it is described that the concave portion 111c is formed between the two shoulder portions 111p of the first bottom portion 111, which is to avoid causing great adverse effects on the structural strength of the first bottom portion 111 in the case that the concave portion 111c is formed. However, the present application is not limited to this, and if the structural strength of the first bottom portion 111 is sufficient, it is not necessary to form the two shoulder portions 111p in the first bottom portion 111, but the concave portion 111c is directly formed in the surface of the first bottom portion 111 facing the second bottom portion 121.

It can be understood that, the radial bearing 2 may be, for example, a double row spherical roller bearing, and the linear bearings 13 may be rolling bearings with cylindrical rollers.

It can be understood that modified design on the second bottom portion 121 of the second bearing seat 12 mounted with the radial bearing 2 can improve the stress distribution of the second bearing seat 12 under radial load and vibration conditions, and reduce the risk of breaking caused by stress concentration, such that the overall service life of the system is increased, and maintenance costs are reduced.

Further, the convex portion 121p of the second bearing seat 12 fits to the concave portion 111c of the first bearing seat 11, which can not only guide the linear relative motion of the second bearing seat 12 relative to the first bearing seat 11, but also prevent the second bearing seat 12 from tilting under a large radial load in the horizontal direction, to ensure uniform forces applied to the two linear bearings 13 mounted between the two bearing seats 11 and 12, reduce the edge stress of the rollers of the linear bearings 13, and alleviate the impact and vibration on the system caused by the large radial load in the horizontal direction, thereby further ensuring the floating function realized by the second bearing seat 12 and increasing the service life of the system.

Further, the two stoppers 14 and 15 are mounted between the second bearing seat 12 and the first bearing seat 11, which can prevent the second bearing seat 12 from tilting under the large radial load in the horizontal direction, thereby avoiding non-uniform forces applied to the linear bearings 13 on both sides and increasing the service life of the linear bearings 13. In addition, the two stoppers also play a role in guiding the linear relative motion of the second bearing seat 12 relative to the first bearing seat 11, thereby reducing vibration and improving the service life of the system.

LIST OF REFERENCE NUMERALS

10 Bearing seat assembly;
101 First bearing seat;
102 Second bearing seat;
103 Linear bearing;
20 Radial bearing;
30 Shaft;
1 Bearing seat assembly;
11 First bearing seat;
111 First bottom portion;
111p Shoulder portion;
111c Concave portion;
112 First side wall portion;
112c First mounting concave portion;
113 Second side wall portion;
113c Second mounting concave portion;
114 First cover portion;
12 Second bearing seat;
121 Second bottom portion;
121p Convex portion;
121c Recessed shape;
122 Second cover portion;
13 Linear bearing;
14 First stopper;
15 Second stopper;
2 Radial bearing;
3 Shaft;
H Height direction;
W Width direction;
A Axial direction.

The invention claimed is:
1. A bearing seat assembly, comprising:
a first bearing seat having a mounting space formed therein, and the first bearing seat including a first bottom portion;
a second bearing seat mounted in the mounting space and including a second bottom portion; and
linear bearings mounted in the mounting space and located between the first bottom portion and the second bottom portion, the second bearing seat being supported by the linear bearings, such that the second bottom portion and the first bottom portion are spaced in a height direction of the bearing seat assembly, and the second bearing seat is linearly movable relative to the first bearing seat;
wherein the second bottom portion includes a convex portion protruding toward the first bottom portion in a central portion of the second bottom portion in a width direction of the bearing seat assembly, and a recessed shape recessed toward a direction away from the first bottom portion is formed in a part of the second bottom portion between the convex portion and both end portions of the second bottom portion in the width direction, the recessed shape forming a curve adjacent the convex portion such that a lower surface of the second bottom portion is non-flat from the central portion to both end portions of the second bottom portion;
and wherein a concave portion opposite to the convex portion is formed in the first bottom portion, the concave portion having an opening that is open toward the convex portion, and the convex portion is inserted into the concave portion by passing through the opening.

2. The bearing seat assembly according to claim 1, wherein two shoulder portions protruding toward the second bottom portion are formed in the first bottom portion, and the concave portion is formed between the two shoulder portions.

3. The bearing seat assembly according to claim 1, wherein a linear bearing of the linear bearings is located on each side of the convex portion in the width direction, to support both end portions of the second bottom portion in the width direction.

4. The bearing seat assembly according to claim 1, wherein the first bearing seat comprises a first side wall portion and a second side wall portion, the first side wall portion and the second side wall portion are fixed to the first bottom portion and are spaced in the width direction, and the second bearing seat is located between the first side wall portion and the second side wall portion; and the bearing seat assembly further comprises a first stopper and a second stopper, the first stopper is clamped between the second bearing seat and the first side wall portion, and the second stopper is clamped between the second bearing seat and the second side wall portion.

5. The bearing seat assembly according to claim 4, wherein the first stopper is detachably fixed to the first side wall portion, and the second stopper is detachably fixed to the second side wall portion.

6. The bearing seat assembly according to claim 4, wherein a first mounting concave portion is formed in the first side wall portion, the first stopper is at least partially located in the first mounting concave portion, and a second mounting concave portion is formed in the second side wall portion, the second stopper is at least partially located in the second mounting concave portion.

7. The bearing seat assembly according to claim 4, wherein the first bearing seat further comprises a first cover portion, the first cover portion is detachably fixed to the first side wall portion and the second side wall portion, and the first cover portion, the first bottom portion, the first side wall portion and the second side wall portion form the mounting space in an enclosed manner.

8. The bearing seat assembly according to claim 1, wherein the second bearing seat further comprises a second cover portion, the second cover portion is fixed to the second bottom portion, and the second cover portion and the second bottom portion form, in an enclosed manner therebetween, a bearing seat hole configured for mounting a radial bearing.

9. A converter device, comprising a radial bearing, a shaft, and the bearing seat assembly according to claim 1, wherein the radial bearing is mounted in the second bearing seat, an outer ring of the radial bearing is fixed to the second bearing seat, and the shaft is inserted into a bearing hole of the radial bearing and is fixed to an inner ring of the radial bearing.

10. A bearing seat assembly, comprising:
a first bearing seat including a mounting space and a first bottom portion;
a second bearing seat mounted in the mounting space of the first bearing seat, and the second bearing seat including a second bottom portion; and
linear bearings mounted between the first bottom portion and the second bottom portion, the second bearing seat being supported by the linear bearings, such that a space is formed between the second bottom portion and the first bottom portion, and the second bearing seat being linearly movable relative to the first bearing seat;

wherein the second bottom portion includes a convex portion protruding toward the first bottom portion in a central portion of the second bottom portion in a width direction of the bearing seat assembly; and wherein a concave portion opposite to the convex portion is formed in the first bottom portion, the concave portion having an opening that is open toward the convex portion, and the convex portion is inserted into the concave portion by passing through the opening, and wherein two shoulder portions protruding toward the second bottom portion are formed in the first bottom portion, the concave portion is formed between the two shoulder portions, and the shoulder portions protrude closer to the second bottom portion than flat surfaces disposed directly adjacent the shoulder portions.

11. The bearing seat assembly according to claim 10, further comprising a recessed shape recessed toward a direction away from the first bottom portion is formed in a part of the second bottom portion between the convex portion and both end portions of the second bottom portion in the width direction.

12. The bearing seat assembly according to claim 10, wherein a linear bearing of the linear bearings is located on each side of the convex portion in the width direction, to support both end portions of the second bottom portion in the width direction.

13. The bearing seat assembly according to claim 10, wherein the first bearing seat comprises a first side wall portion and a second side wall portion, the first side wall portion and the second side wall portion are fixed to the first bottom portion and are spaced in the width direction, and the second bearing seat is located between the first side wall portion and the second side wall portion; and the bearing seat assembly further comprises a first stopper and a second stopper, the first stopper is clamped between the second bearing seat and the first side wall portion, and the second stopper is clamped between the second bearing seat and the second side wall portion.

14. The bearing seat assembly according to claim 13, wherein the first stopper is detachably fixed to the first side wall portion, and the second stopper is detachably fixed to the second side wall portion.

15. The bearing seat assembly according to claim 13, wherein a first mounting concave portion is formed in the first side wall portion, the first stopper is at least partially located in the first mounting concave portion, and a second mounting concave portion is formed in the second side wall portion, the second stopper is at least partially located in the second mounting concave portion.

16. The bearing seat assembly according to claim 13, wherein the first bearing seat further comprises a first cover portion, the first cover portion is detachably fixed to the first side wall portion and the second side wall portion, and the first cover portion, the first bottom portion, the first side wall portion and the second side wall portion form the mounting space in an enclosed manner.

17. The bearing seat assembly according to claim 10, wherein the second bearing seat further comprises a second cover portion, the second cover portion is fixed to the second bottom portion, and the second cover portion and the second bottom portion form, in an enclosed manner therebetween, a bearing seat hole configured for mounting a radial bearing.

18. A converter device, comprising:
a radial bearing;
a shaft; and
a bearing seat assembly, comprising:

a first bearing seat including a mounting space and a first bottom portion;

a second bearing seat mounted in the mounting space of the first bearing seat, and the second bearing seat including a second bottom portion; and linear bearings mounted between the first bottom portion and the second bottom portion, the second bearing seat being supported by the linear bearings, such that a space is formed between the second bottom portion and the first bottom portion, and the second bearing seat being linearly movable relative to the first bearing seat;

wherein the second bottom portion includes a convex portion protruding toward the first bottom portion in a central portion of the second bottom portion in a width direction of the bearing seat assembly;

wherein a concave portion opposite to the convex portion is formed in the first bottom portion, the concave portion having an opening that is open toward the convex portion, and the convex portion is inserted into the concave portion by passing through the opening;

wherein the first bearing seat comprises a first side wall portion and a second side wall portion, the first side wall portion and the second side wall portion are fixed to the first bottom portion and are spaced in the width direction, and the second bearing seat is located between the first side wall portion and the second side wall portion; and the bearing seat assembly further comprises a first stopper and a second stopper, the first stopper is clamped solely and directly between the second bearing seat and the first side wall portion, and the second stopper is clamped solely and directly between the second bearing seat and the second side wall portion;

wherein the radial bearing is mounted in the second bearing seat, an outer ring of the radial bearing is fixed to the second bearing seat, and the shaft is inserted into a bearing hole of the radial bearing and is fixed to an inner ring of the radial bearing.

* * * * *